US008705090B2

(12) United States Patent
Gnanasambandam et al.

(10) Patent No.: US 8,705,090 B2
(45) Date of Patent: Apr. 22, 2014

(54) SYSTEM AND METHOD FOR BURSTINESS-AWARE SCHEDULING AND CAPACITY ASSESSMENT ON A NETWORK OF ELECTRONIC DEVICES

(75) Inventors: Shanmuganathan Gnanasambandam, Victor, NY (US); Naveen Sharma, Fairport, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 939 days.

(21) Appl. No.: 12/760,920

(22) Filed: Apr. 15, 2010

(65) Prior Publication Data

US 2011/0255125 A1 Oct. 20, 2011

(51) Int. Cl.
 *G06F 3/12* (2006.01)
(52) U.S. Cl.
 USPC .......... 358/1.15; 705/7.22; 705/301; 718/105
(58) Field of Classification Search
 USPC .............. 358/1.16, 1.15; 370/230.1; 705/301, 705/7.22; 709/218, 225, 229; 715/765; 718/100, 101, 102, 103, 105
 See application file for complete search history.

(56) References Cited

U.S. PATENT DOCUMENTS

| | | | |
|---|---|---|---|
| 7,372,820 B1 | 5/2008 | Cheung et al. | |
| 7,389,336 B2 | 6/2008 | Sethi | |
| 2003/0058277 A1* | 3/2003 | Bowman-Amuah | 345/765 |
| 2004/0190042 A1* | 9/2004 | Ferlitsch et al. | 358/1.15 |
| 2005/0198335 A1* | 9/2005 | Brown et al. | 709/229 |
| 2006/0070074 A1* | 3/2006 | Maeda et al. | 718/100 |
| 2006/0193006 A1* | 8/2006 | Lawrence et al. | 358/1.16 |
| 2006/0227373 A1* | 10/2006 | Matoba | 358/1.15 |
| 2007/0201078 A1* | 8/2007 | Morales et al. | 358/1.15 |
| 2008/0022285 A1* | 1/2008 | Cherkasova et al. | 718/104 |
| 2008/0077427 A1* | 3/2008 | Maruoka | 705/1 |
| 2008/0204794 A1* | 8/2008 | Watterson et al. | 358/1.15 |
| 2008/0253311 A1* | 10/2008 | Jin | 370/311 |
| 2008/0267065 A1 | 10/2008 | Balakrishnan et al. | |
| 2009/0016335 A1* | 1/2009 | Bays | 370/389 |
| 2009/0158288 A1* | 6/2009 | Fulton et al. | 718/103 |
| 2009/0241117 A1* | 9/2009 | Dasgupta et al. | 718/101 |
| 2010/0125666 A1* | 5/2010 | Yang | 709/225 |

OTHER PUBLICATIONS http://www.pcmag.com/encyclopedia; definition of bursty; The Computer Language Company Inc. 1981-2010.
The β- factor Measuring Wireless Link Burstiness; Kannan Srinivasan, et al.; Computer Systems Lab; Stanford University, published by ACM, NY NY, 2008.

* cited by examiner

*Primary Examiner* — David S Cammack
(74) *Attorney, Agent, or Firm* — Fay Sharpe LLP

(57) ABSTRACT

A system and method for establishing a burstiness metric is presented including at least one processor and a computer-readable storage medium in communication with the at least one processor, wherein the computer-readable storage medium comprises one or more programming instructions for performing the steps of: receiving information related to a plurality of tasks performed by a plurality of electronic devices based on input received from one or more users; analyzing the received information; employing an availability model to the information analyzed; and generating a schedule based on the information analyzed and the availability model by redistributing at least one task of the plurality of tasks between the plurality of electronic devices in accordance with electronic device availability and computational loads. Also, an assessment is made based on the information analyzed to determine a proportion of the plurality of tasks to be supported to achieve a required quality of service.

24 Claims, 7 Drawing Sheets

SYSTEM AND METHOD FOR BURSTINESS-AWARE SCHEDULING AND CAPACITY ASSESSMENT ON A NETWORK OF ELECTRONIC DEVICES

CROSS REFERENCE TO RELATED APPLICATION

The present application relates to co-pending U.S. patent application Ser. No. 12/467,690 and filed on May 18, 2009 entitled, "SYSTEM AND METHOD PROVIDING FOR RESOURCE EXCLUSIVITY GUARANTEES IN A NETWORK OF MULTIFUNCTIONAL DEVICES WITH PREEMPTIVE SCHEDULING CAPABILITIES," the disclosure of which is hereby incorporated by reference in its entirety.

BACKGROUND

1. Field of Related Art

The present disclosure is generally related to job/task processing in a network environment, and more particularly, to a system and method for redistributing resources within an electronic device environment based on burstiness characteristics.

2. Description of Related Art

"Multi-function" machines or multifunction devices (MFDs) have become familiar in offices and in home computing environments. Whereas, previously, functions such as copying, printing, and facsimile transmission have been performed by single dedicated copiers, printers, and facsimiles respectively, a multi-function machine may typically be capable of providing all such functions and more in a single machine. Typically, such a multi-function machine may include a single print engine, which may serve to output copies, prints, or received facsimiles; as well as a single input scanner which may serve to record data from original images for use in copying, facsimile transmission, and retention of input image data to a predetermined location in a computer memory. The MFDs may not merely be general purpose machines. Instead, MFDs may be processors dedicated to special purpose tasks/jobs, and capable of being leveraged for distributed computations. However, several types of electronic devices may include processors dedicated to special purpose tasks/jobs, and capable of being leveraged for distributed computations.

Distributed computing is a field that studies distributed systems. A distributed system may consist of multiple autonomous computers that communicate through a computer network. The computers may interact with each other in order to achieve a common goal. A computer program that runs in a distributed system may be referred to as a distributed program, and distributed programming may be the process of writing such programs. A distributed system may have a common goal, such as solving a large computational problem.

Since electronic devices are universally used, it would be useful to enable task/job distinguishment/discrimination among a plurality of electronic devices and to treat such tasks/jobs associated with the electronic devices differently based on a variety of factors, such as burstiness data and priority data. For example, some electronic devices and/or local jobs may be submitted directly to an electronic device. Other jobs, such as large optical character recognition (OCR) jobs, are very resource and time-consuming and often take several minutes to complete, particularly for complex documents. The electronic devices receiving the jobs/tasks may need to complete both kinds of jobs/tasks in a timely fashion.

In such environments, it may be necessary to reduce preemption rates in order to efficiently process all jobs simultaneously.

Thus, while it is known that electronic devices may be idle for high percentages of time, thereby wasting good computing resources, electronic devices, on the other hand, also need the collective totality of those resources for intensive image/document related processing during the busy times, thus operating together on various kinds of tasks. It may be desirable to process all tasks simultaneously, while reducing preemption and makespan rates.

SUMMARY

A system is presented for establishing a burstiness metric, including at least one processor; and a computer-readable storage medium in communication with the at least one processor, wherein the computer-readable storage medium comprises one or more programming instructions for: receiving information related to a plurality of tasks performed by a plurality of electronic devices based on input received from one or more users; analyzing the received information; employing an availability model to the information analyzed; and generating a schedule based on the information analyzed and the availability model by redistributing at least one task of the plurality of tasks between the plurality of electronic devices in accordance with electronic device availability and computational loads. An assessment is also made based on the information analyzed to determine a proportion of the plurality of tasks to be supported to achieve a required quality of service.

A method is presented for establishing a burstiness metric, including performing one or more programming instructions via a tangible processor for: receiving information related to a plurality of tasks performed by a plurality of electronic devices based on input received from one or more users; analyzing the received information; employing an availability model to the information analyzed; and generating a schedule based on the information analyzed and the availability model by redistributing at least one task of the plurality of tasks between the plurality of electronic devices in accordance with electronic device availability and computational loads. An assessment is also made based on the information analyzed to determine a proportion of the plurality of tasks to be supported to achieve a required quality of service.

The present disclosure also provides a computer-readable medium which stores programmable instructions configured for being executed by at least one processor for performing the methods described herein according to the present disclosure. The computer-readable medium may include at least flash memory, CD-ROM, a hard drive, etc.

Other features of the presently disclosed system and method for scheduling jobs/tasks will become apparent from the following detailed description, taken in conjunction with the accompanying drawings, which illustrate, by way of example, the presently disclosed system and method for scheduling jobs/tasks.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
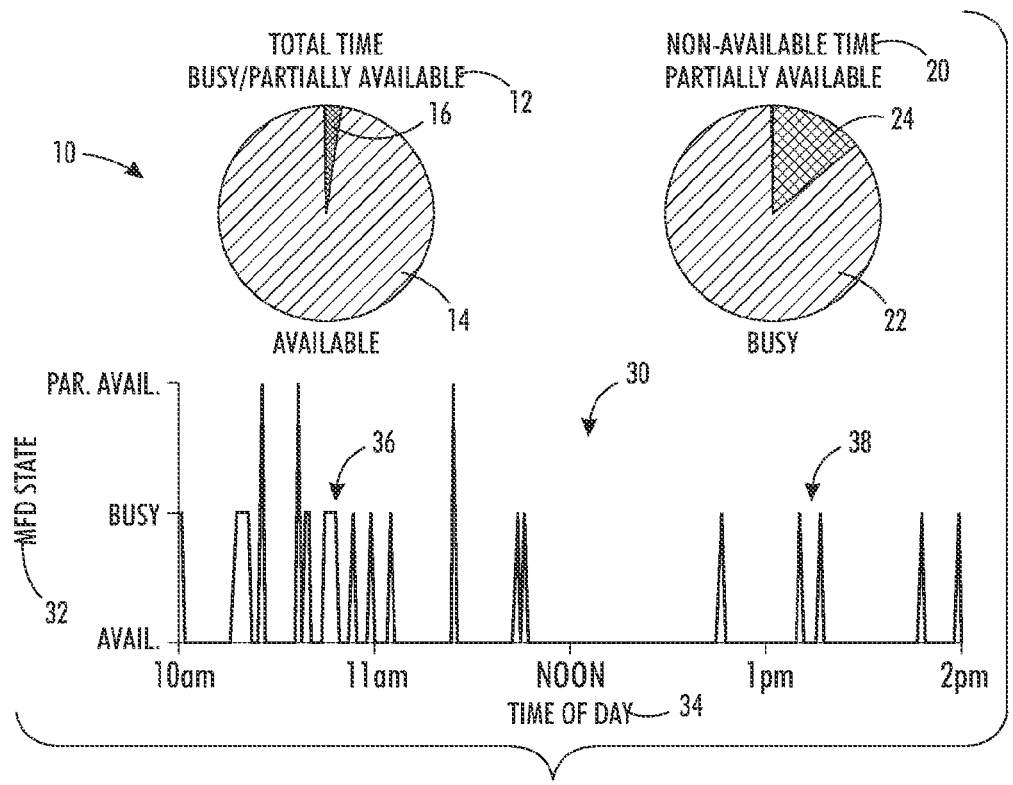
FIG. 1 shows a multifunction device (MFD) workload chart including a plurality of bursty job/task patterns, in accordance with the present disclosure.

Particular embodiments of the present disclosure are described herein below with reference to the accompanying drawings. In the following description, well-known functions or constructions are not described in detail to avoid obscuring the present disclosure in unnecessary detail.

In the following detailed description, example embodiments disclosing specific details are set forth in order to provide an understanding of the present disclosure. The example embodiments are set forth for purposes of explanation and not limitation. Those of ordinary skill in the art will understand that various changes in form and details may be made to the example embodiments without departing from the scope of the present disclosure. Moreover, descriptions of well-known devices, methods, systems, and protocols may be omitted so as to not obscure the description of the example embodiments. Nonetheless, such devices, methods, systems and protocols that are within the purview of those of ordinary skill in the art are contemplated by the example embodiments.

The exemplary embodiments of the present disclosure propose a method for efficiently computing burstiness with respect to a chosen time point to be employed in a scheduler that may guarantee reduced makespan and preemptions with respect to an available fleet of MFDs or electronic devices. The exemplary embodiments further propose a method for computing the usable size of available excess capacity with respect to a burstiness and time-of-day aware scheduler. The exemplary embodiments also propose profiling based on burstiness and time-of-day dependent availability so as to decide if a fleet of MFDs or electronic devices needs to be provisioned with additional computing capacity.

The exemplary embodiments of the present disclosure further propose the development of a burstiness metric with respect to a plurality of MFDs or electronic devices and server workload. A method is presented for calculating the burstiness metric without requiring too much computational overhead. Additionally, the exemplary embodiments demonstrate with real workload that a specified quantum of additional workload may be scheduled subject to a quantifiable impact (e.g., enabling the specification of service level agreements). A simulation-based tool to judge the impact on a service level agreement (SLA) given current capacity and workload is also provided. The simulation tool may capture a parameterizable partial availability state that models states less intensive than printing (including RIPing) but significantly more intensive than the idle state.

The exemplary embodiments of the present disclosure further propose a method for analyzing timing characteristics of computing tasks on a fleet of MFD's or electronic devices as an aid in scheduling to achieve a desired SLA for task completion. The burstiness metric for the likelihood of high priority native tasks (e.g., local jobs) being submitted during time intervals may be defined and calculated for rolling time intervals. Based on the burstiness metric, the size of the cloud computing tasks that may be successfully completed without interruption may be calculated as a probability with statistical confidence intervals. The relationship between cloud computing task size and successful task completion probability may be used to determine the value of deploying additional MFD's or electronic devices (i.e., provisioning and right-sizing an MFD fleet or electronic devices for a given workload). The ability to characterize the amount of work that an MFD or electronic device may provide as a service to a cloud computing installation may enable the sales of cloud computing services from MFDs or electronic devices.

In particular, a number of aspects of the present disclosure may relate to: (1) Scheduling with completion guarantees for class 2 grid jobs, (2) Strategies for separating grid jobs from core MFD or electronic device jobs, which may relate to designing for the lossless nature of class 2 jobs while simultaneously providing resource exclusivity for class 1 jobs, (3) Time-of-day, burstiness, and availability models for devices in the grid, which scheduling takes advantage of, and (4) Storing the grid jobs or their parts in a distributed datastructure and resumption logic thereof, so that any MFD or electronic device may resume preempted or rejected class 2 jobs.

Prior to describing the present disclosure in further detail, it will first be helpful to define various terms that will be used throughout the following discussion. For example:

The term "print" may be overloaded to mean sending the document to the printer through any one of a multitude of ways. Moreover, the term "printer" may refer to any device that accepts text and graphic output from any type of computing device and transfers the information to any printable medium. A "printer" may refer to any type of xerographic, solid ink, liquid ink, cut sheet or web-based device used to print onto a wide array of printable media. The term "printer" as used herein may encompass any apparatus, such as a digital copier, bookmaking machine, facsimile machine, multi-function machine, etc. which performs a print outputting function for any purpose.

The term "multi-function machine" or "MFD" may refer to any machine that connects to either a computing device and/or network and performs one or more of the following functions: print, scan, copy, and/or fax. Digital copiers, fax machines, printers, and scanner combinations are all examples of MFDs. The term "MFD" may further refer to any hardware that combines several functions in one unit. For instance, an MFD may be a standalone printer or any type of standalone machine/device/apparatus/component. For example, an MFD may be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "MFDs" may refer to any type of electronics suitable for use with a circuit board and intended to be used by a plurality of individuals for a variety of purposes. The terms "multi-function machine" and "MFD" may be used interchangeably throughout the specification.

MFDs disclosed herein include both those that are "connected" and those that are "unconnected." An "unconnected" MFD does not have access to a network (e.g., the Internet). A "connected" MFD may be normally connected via an Ethernet card or the like to a network. In the present embodiments, the MFD may be an unconnected MFD that may be in operative communication with a wireless device, the wireless device being able to access a network. A connection between the multifunctional device and the wireless device may be made through a two-way communication channel located on the multifunctional device.

The term "storage" may refer to data storage. "Data storage" may refer to any article or material (e.g., a hard disk) from which information may be capable of being reproduced, with or without the aid of any other article or device. "Data storage" may refer to the holding of data in an electromagnetic form for access by a computer processor. Primary storage may be data in random access memory (RAM) and other "built-in" devices. Secondary storage may be data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "module" may refer to a self-contained component (unit or item) that may be used in combination with other components and/or a separate and distinct unit of hardware or software that may be used as a component in a system, such as a printing system including a plurality of multi-function printers and/or multi-function devices (MFDs). The term "module" may also refer to a self-contained assembly of electronic components and circuitry, such as a stage in a computer that may be installed as a unit.

The term "analyze" may refer to determining the elements or essential features or functions or processes of one or more MFDs for computational processing. The term "analyze" may further refer to tracking data and/or collecting data and/or manipulating data and/or examining data and/or updating data on a real-time basis in an automatic manner and/or a selective manner and/or manual manner.

The term "electronic device" may refer to one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "electronic device" may refer to any type of electronics suitable for use with a circuit board and intended to be used by a plurality of individuals for a variety of purposes. The electronic device may be any type of computing and/or processing device. It is noted that an electronic device may also refer to an MFD as defined above.

The term "processing" may refer to determining the elements or essential features or functions or processes of one or more MFDs or of one or more electronic devices for computational processing. The term "process" may further refer to tracking data and/or collecting data and/or manipulating data and/or examining data and/or updating data on a real-time basis in an automatic manner and/or a selective manner and/or manual manner.

The term "task" may refer to a print, scan, copy, and/or fax job or any type of function that may be performed by an MFD or electronic device. The term "task" may also refer to an execution path through address space, such as a set of program instructions that may be loaded in a data storage means. The term "task" may also refer to a basic unit of programming that an operating system controls and depending on how the operating system defines a task in its design, this unit of programming may be an entire program or each successive invocation of a program. The term "task" may be synonymous with or refer to jobs or activities or capabilities. The term "task" may also refer to a grid job (a parallelizable job) or portions thereof.

Additionally, "code" as used herein, or "program" as used herein, may be any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more MFDs or one or more electronic devices or servers to operate one or more processors to run the burstiness algorithms. It is to be understood, therefore, that this disclosure is not limited to the particular forms illustrated and that it is intended in the appended claims to embrace all alternatives, modifications, and variations which do not depart from the spirit and scope of the embodiments described herein.

The term "burstiness" may refer to jobs/tasks on a plurality of MFDs or a plurality of electronic devices and print devices/electronic devices that exhibit burstiness, that is, intermittent short jobs/tasks of high priority followed by available idle periods.

The term "preempt" may refer to having precedence or predominance over. The term "preempt" may be equivalent to or refer to superseding, supervening, supplanting, or replacing.

The term "preemption rates" may refer to native MFD workloads or electronic device workloads as the first class which has high priority and any other workload (including additional printing) as the second class of jobs. Even idle periods (as dictated by class 1 jobs) may be hard to take advantage of for processing the other (a generic second class of) jobs as the high-priority jobs preempt lower priority jobs. The rate at which the second class of jobs gets rejected may be called failure or preemption rate. Lowering preemption rates would require a burstiness and time-of-day, burstiness, and availability conscious scheduler(s), as discussed below. A new metric may be proposed for heuristic scheduling that enhances SLAs (e.g., makespan, preemptions, availability etc.).

The term "excess capacity" may refer to the substantial amount of interspersed available time after consumption by native MFD workload or native electronic device workload that does not straight away accrue into usable excess time or available excess capacity because of burstiness and the randomness associated with arrival patterns. Hence, excess capacity may be defined as that capacity that may be made available for other processes while guaranteeing a confidence interval on preemptions by native MFD processes or electronic device processes.

Embodiments will be described below while referencing the accompanying figures. The accompanying figures are merely examples and are not intended to limit the scope of the present disclosure.

Referring to FIG. 1, a multifunction device (MFD) workload chart including a plurality of bursty job/task patterns is illustrated, in accordance with the present disclosure. Of course, the MFD may be substituted with any type of electronic device contemplated by one skilled in the art. Furthermore, the MFD or MFDs described in all the exemplary embodiments and in all the Figures may be substituted with a plurality of different electronic devices, as contemplated by one skilled in the art for desired applications.

The workload chart 10 illustrates an availability pie chart 12 and a non-availability pie chart 20. The availability pie chart 12 shows an available section 14 and a partially available section 16. The non-availability pie chart 20 shows a busy section 22 and a partially available section 24. Additionally, a graph 30 illustrating the state of an MFD is shown in workload chart 10. The y-axis of the graph 30 illustrates the MFD state 32 and the x-axis of the graph 30 illustrates the time of day 34. As shown in graph 30, there may be several bursts 36, 38 throughout the day.

The present disclosure proposes one or more algorithms, such as burstiness algorithms, for simultaneously providing resource exclusivity guarantees on a first type of MFD job while promising that a second type of job may definitely be complete in a grid-enabled MFD environment. A grid-enabled MFD environment may have two job classes with different expectations: (a) core MFD jobs (e.g., class 1) that require 100% of MFD resources for computation intensive tasks irrespective of other jobs' requirements and (b) grid jobs (e.g., class 2) that may be elastic/flexible to the requirements of core jobs in terms of being able to relinquish resources to core jobs and still complete on time.

The present disclosure further proposes scheduling replicated class 2 sub jobs such that the whole class 2 job has a high completion probability by taking advantage of time-of-day (or burstiness) sensitive time-series models for class 1 jobs. Even in the unlikely event that all of the replicates may be preempted or dropped owing to the arrival of class 1 jobs, the MFD grid backs off and reschedules the class 2 jobs.

The present disclosure provides various strategies to release resources for the class 1 jobs when class 2 jobs may be preempted or rejected. Furthermore, the exemplary embodiments of the present disclosure may reject jobs/tasks of the more elastic/flexible class 2 type only if the completion probabilities of those tasks may not be above the set threshold to address network overhead. Thus, the present disclosure proposes a class-sensitive, burstiness scheduling and preemption mechanism in a multi-class MFD grid environment with quantifiable guarantees on job completion and rejection.

Additionally, when using the MFD grid of interconnected MFDs for computationally distributable activities they tend to grab CPU cycles away from core MFD functionality. Core MFD functionality (also referred to as core jobs) may include printing, scanning, copying, emailing, and faxing that a user has specifically directed to a device, most commonly by the physical presence of the user at the MFD. The other class of activities, termed grid jobs, include jobs created or sub-divided by the grid, grid upkeep activities, jobs not created by a user (but by the grid on his/her behalf) and the like.

While both job types may be useful, grid jobs have greater flexibility than core jobs because of the way the grid of MFDs has been architected. Hence, the core jobs may be referred to as class 1 jobs and the grid jobs may be referred to as class 2 jobs, with class 1 jobs/tasks having a higher priority than class 2 jobs/tasks. This also means that class 2 jobs may be preempted by class 1 jobs. Next, there may be another reason why class 1 jobs may be given higher priority. While MFDs may be powerful devices, the reason they have been endowed with such power may be because of the high processing requirements of some image processing jobs. Hence it may not be worthwhile for the grid jobs to grab resources (memory, CPU, network etc.) at the same time of core job, especially when they are more elastic/flexible.

Additionally, the exemplary algorithms of the exemplary embodiments of the present disclosure may distinguish core jobs from grid jobs (and/or sub-divided grid jobs) given the concurrency conditions of many of the jobs and the portions of the device controller they access. Thus, the exemplary algorithms may safely expose certain APIs (application programming interface) that promote higher utilization of MFDs in the presence of the mixed class of jobs (e.g., core jobs, grid jobs).

The present disclosure relates to a process of efficiently computing a burstiness metric, factoring in an availability model, and subsequently using the aforementioned metric for scheduling class 1 and class 2 jobs/tasks. One goal of the scheduler may be to reduce preemptions and decrease makespan for a set of cloud jobs.

Cloud jobs may be an umbrella term for at least two types of workload. Cloud jobs may be extra MFD workload (print, scan, fax, OCR, email etc.). The goal may be to determine if extra MFD resources may be necessary for a given organization or if the current MFD fleet may tolerate additional load without violating availability related service level agreements (SLAs). MFDs themselves may need bursts of computational power, perhaps from one another, to perform image processing, including raster processing, image corrections and enhancements, and other matrix operations that could be parallelized using known techniques. Sharing the burden of demanding jobs may allow fewer MFDs to meet the peak needs of bursty job arrivals. Thus, MFDs, while powerful devices, may be designed for handling processing intensive native tasks. This justifies the preemption of grid jobs even though native jobs may be relatively short. As a result, lower priority cloud tasks must be able to tolerate frequent disruptions (i.e., the MFD being unavailable but functioning) created by higher priority native jobs by having a loss tolerance for both priorities. FIGS. 2-6 below demonstrate such MFD capabilities.

Figure 2:
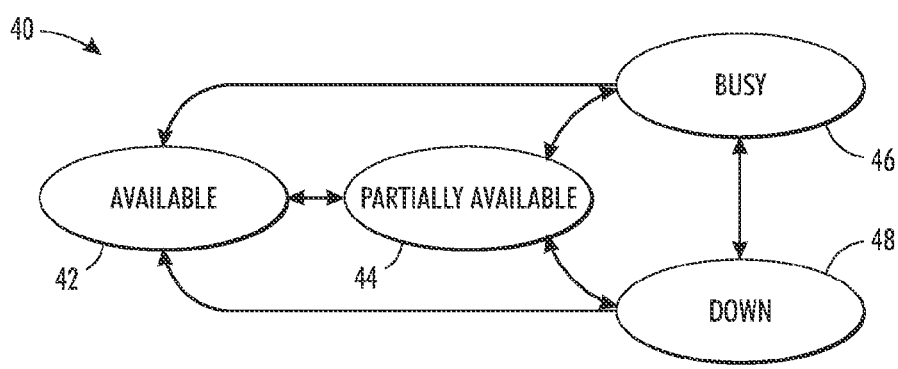
FIG. 2 shows a multifunction device availability model identifying at least four available states, in accordance with the present disclosure.
Figure 3A:
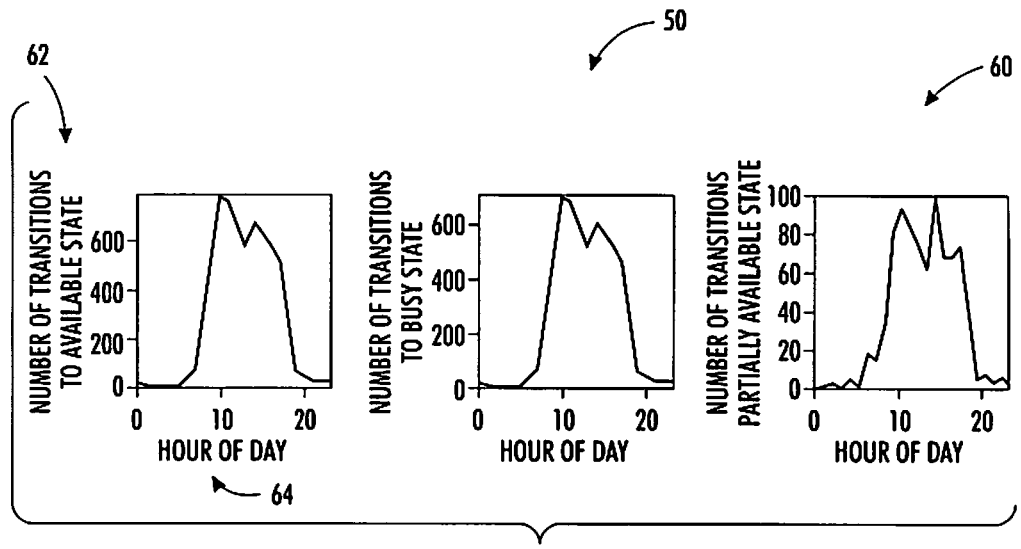
FIGS. 3A-3D show a plurality of period-of-days models with associated state transition characteristics, in accordance with the present disclosure.
Figure 3B:
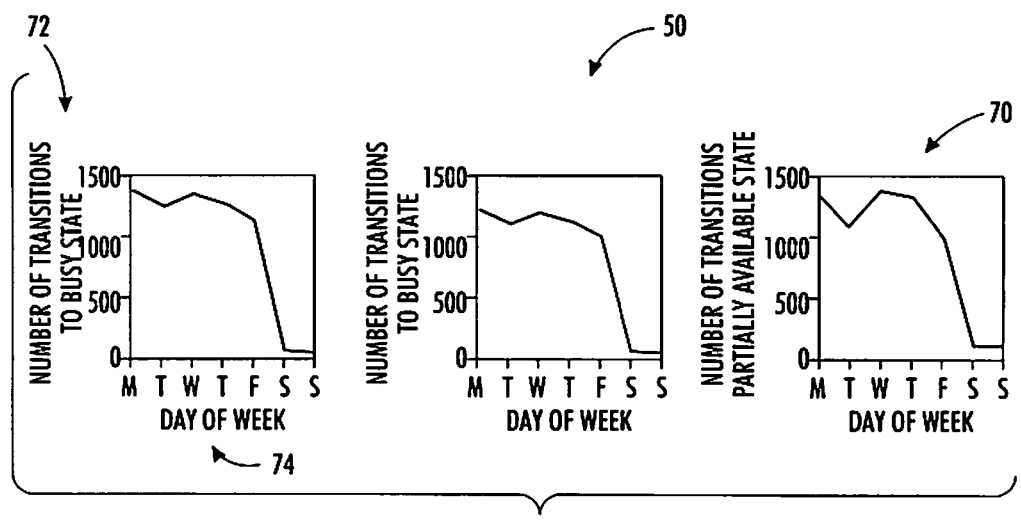
Figure 3C:
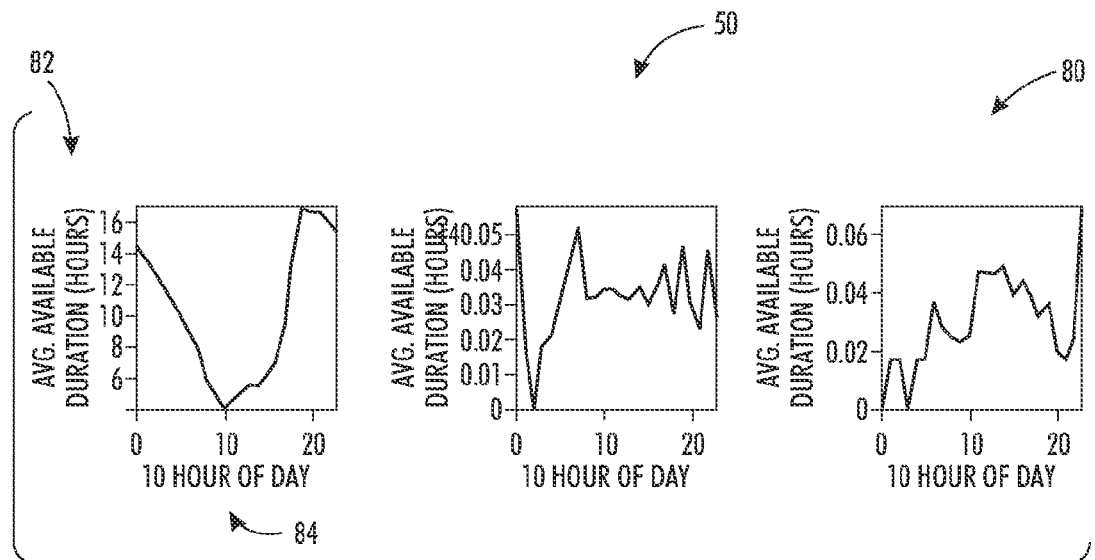
Figure 3D:
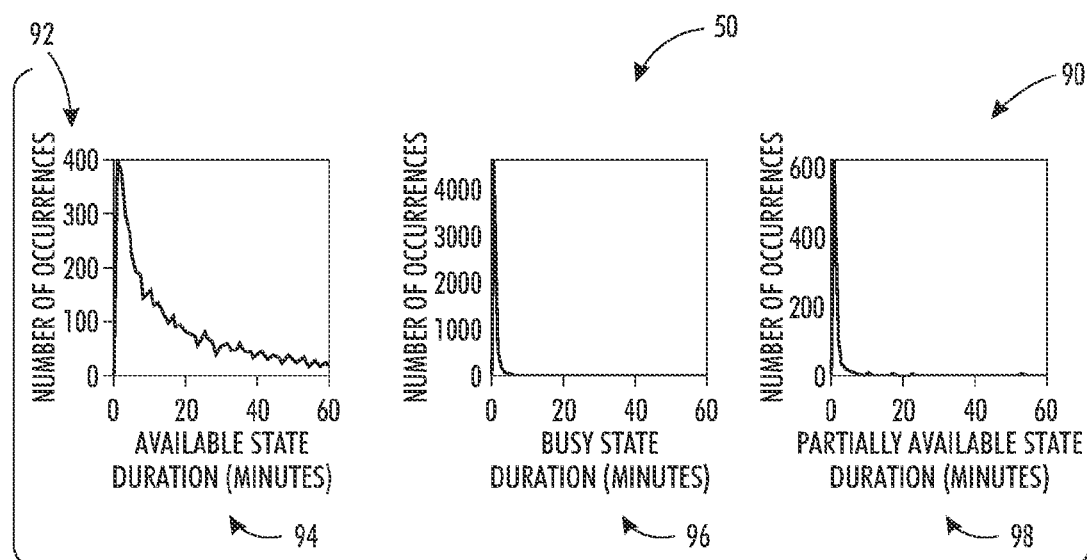

Referring to FIG. 2, a multifunction device availability model identifying at least four available states is illustrated, in accordance with the present disclosure.

The availability model 40 illustrates at least four states. A first state 42 pertains to an "available" state. A second state 44 pertains to a "partially available" state. A third state 46 pertains to a "busy" state. A fourth state 48 pertains to a "down" state.

One area of interest may be determining how the job/task patterns of a certain core set of native MFD functionality (e.g., core jobs) affects the availability of CPU cycles to a second and elastic (i.e., expendable) class of jobs/tasks that may be called grid jobs. MFDs oscillate between being available and unavailable to grid applications depending on the load they experience from users. When and how they do so closely follows the demand for core functionality and the usage characteristics of those applications. FIG. 2 identifies at least four availability states that influence executing external applications on predominantly MFD resources, as described above.

The "available" state for an MFD may be currently running with network connectivity, and may not be performing any other document related task such as printing, scanning, faxing, emailing, character recognition or image enhancement. It may or may not be running a cloud application in this case. An MFD may transition to a "partially available" state (e.g., scan/fax/email with reduced CPU availability as a result of daughter cards or specialized hardware) or "busy" state (e.g., printing) if that type of job/task has begun on that resource. Finally, if an MFD fails or becomes unreachable, it may directly transition to being in the "down" state. These states differentiate the types of availability and unavailability a resource may experience. When scheduling jobs onto an MFD cloud, it may be best to avoid MFDs which may be likely to experience the "busy" state (e.g., printing) before the application has finished executing. This may be due to the fact that if the "busy" state may be entered, the grid job may be preempted with all progress made by the application being lost. Additionally, entering the "partially available" (e.g., scan/fax/email) state may also be detrimental to an executing cloud application as the processing cycles may be stolen by high priority core functionalities.

The aforementioned job types have different tolerances for getting dropped, delayed, user reaction and experience, and the robustness that may be built in to handle the respective types. Because of these differences it may be preferred to divide the jobs into two classes, as mentioned above. For example: Class 1: Core MFD jobs from users (e.g., print, scan, email, copy, fax and/or other jobs where the user is at the machine). Class 2: Grid jobs (e.g., jobs or sub jobs not created on the primary MFD where the user initiated a service request of any kind where in the grid transported the complete job and/or parts thereof for parallel-execution).

After the jobs may be separated into two categories of varying capabilities, and after a separate class may be established for each category of jobs/tasks/capabilities, a relationship may be established between the class 1 jobs and the class 2 jobs. For instance, the class 2 queue may sense/monitor/track the load/volume of activity of class 1 queue (of device and/or other devices). This could be accomplished through an SNMP (simple network management protocol) and Web Services call to the concerned device's job monitoring MIB (management information base) to note the origin and status of the jobs/tasks/activities/capabilities in the queue. Other methods such as custom programming interfaces may also be feasible for job status monitoring.

Therefore, every MFD that supports the aforementioned two class architecture may be built such that the class 2 tasks may be more elastic/flexible than the class 1 tasks. In other words, if class 2 tasks may be dropped, the system does not face a severe penalty. However, class 2 tasks could be rescheduled in order to account for elasticity/flexibility requirements that class 1 poses on class 2 jobs. The rescheduling may be automatically performed based on availability, burstiness, and time-constraints, and based on the availability model 40 presented in FIG. 2.

Referring to FIGS. 3A-3D, a plurality of period-of-days models with associated state transition characteristics is illustrated, in accordance with the present disclosure.

The period-of-days models 50 illustrate several states of transition for an MFD. In a first state of transition 60 (see FIG. 3A), the y-axis 62 pertains to the number of transitions and the x-axis 64 pertains to the hours of day. In a second state of transition 70 (see FIG. 3B), the y-axis 72 pertains to the number of transitions and the x-axis 74 pertains to the days of week. In a third state of transition 80 (see FIG. 3C), the y-axis 82 pertains to the average available duration and the x-axis 84 pertains to the hours of day. In a fourth state of transition 90 (see FIG. 3D), the y-axis 92 pertains to the number of transitions and the first x-axis 94 pertains to the available state duration, the second x-axis 96 pertains to the busy state duration, and the third x-axis 98 pertains to a partially available state duration.

The period-of-day(s) models 50 illustrated in FIG. 3 were developed using a 153 day (~220,000 minutes) MFD workload trace from a representative office environment. Of course, one skilled in the art may contemplate using any number of days depending on the desired application. Since a single quantum of a cloud job would be of the order of minutes, the trace was adequate for these circumstances.

Figure 4:
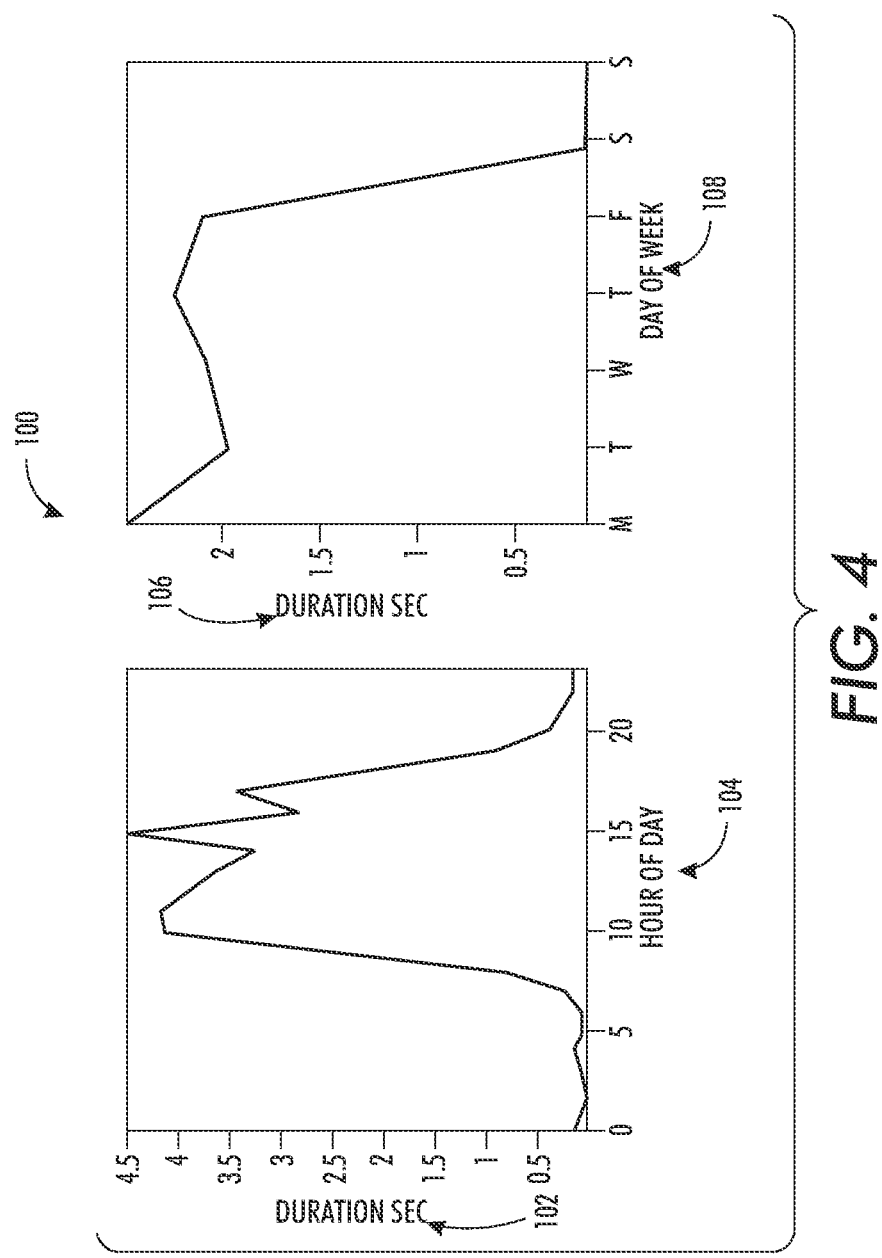
FIG. 4 shows a characterization of burstiness for an MFD workload, in accordance with the present disclosure.

Referring to FIG. 4, a characterization of burstiness for an MFD workload is illustrated, in accordance with the present disclosure.

The burstiness workload 100 illustrates a first workload graph having a y-axis 102 that pertains to burstiness values and the x-axis 104 pertains to hours of day. The burstiness workload 100 illustrates a second workload graph having a y-axis 106 that pertains to burstiness values and the x-axis 108 pertains to days of week.

The burstiness metric may include at least two dimensionless quantities that characterize the burstiness quantitatively. The first quantity may be called the strength (S) of the burst and may be defined as:

$$S_p = \frac{n_p}{\mu_B}$$

Where $n_p$ is the number of jobs in a time block, p, and $\mu_B$ is the mean time across the number of jobs in all blocks. A quantity greater than one denotes that a time block, p, may be experiencing a burst of a good magnitude.

The second quantity may be called the spread ratio (D) and may be defined as:

$$D_p = \frac{\sigma}{\sigma_p}$$

Where $\sigma$ is the standard deviation of the time between jobs for a block and $\sigma_p$ is the standard deviation of the time in between jobs across the jobs in all blocks. A quantity greater than one denotes that a time block, p, may be experiencing a tighter cluster with respect to the whole time history time window.

The burstiness of a window may be defined as:

$$B_p = S_p + D_p$$

To perform high performance distributed cloud computing on bursty devices (either due to preemption by higher priority jobs or local failure), a metric of burstiness may need to be utilized in conjunction with an availability prediction model. This proposed metric may enable the exemplary embodiments to schedule jobs only when burstiness is absent (or not detected) and thereby may provide a good estimate of availability that may be present for the period under consideration.

Additionally, at least four burstiness awareness scheduling strategies may be employed. The first scheduling strategy may be a random strategy, the second scheduling strategy may be an upper bound strategy, the third scheduling strategy may be a burst strategy, and the fourth scheduling strategy may be a burst-speed strategy.

In the random strategy, an MFD may be randomly selected for execution. In the upper bound strategy, an available MFD may be selected that may execute the job/task in the smallest execution time, without preemption, based on global knowledge of MFD availability. In the burst strategy, for each job/task, each MFD's burstiness may be calculated at the time the job/task may be scheduled. The MFD with the smallest burstiness value may be selected for the job execution. In the burst-speed strategy, for each job/task, each MFD's burstiness may be calculated at the time the job may be being scheduled.

The MFD with the highest score may be selected, where the score of the MFD may be calculated according to the following expression:

$$RS_i = \frac{100 - B_i}{100} \cdot \frac{CPU_{max}}{CPU_i}$$

Where $B_i$ is MFD i's burstiness, $CPU_i$ is its CPU speed and $CPU_{max}$ is the highest CPU speed of all resources (for normalization).

In summary, the random scheduler may be a scheduler with no information and may represent the lower bound of possible scheduling results. The upper bound scheduler may be a scheduler with global knowledge and may represent an upper bound on possible scheduling results. In a system where reservations may be permitted, previously flagged portions of availability may take the place of global knowledge. Both the burst scheduler and the burst-speed scheduler may be "greedy" schedulers. The burst scheduler may only take MFD volatility into account, whereas the burst-speed scheduler may take into account both MFD volatility and speed. Quantitatively upper bound may refer to maximum makespan improvement and vice versa. Simultaneously, upper bound may be related to the lowest preemption or failure rate.

Figure 5:
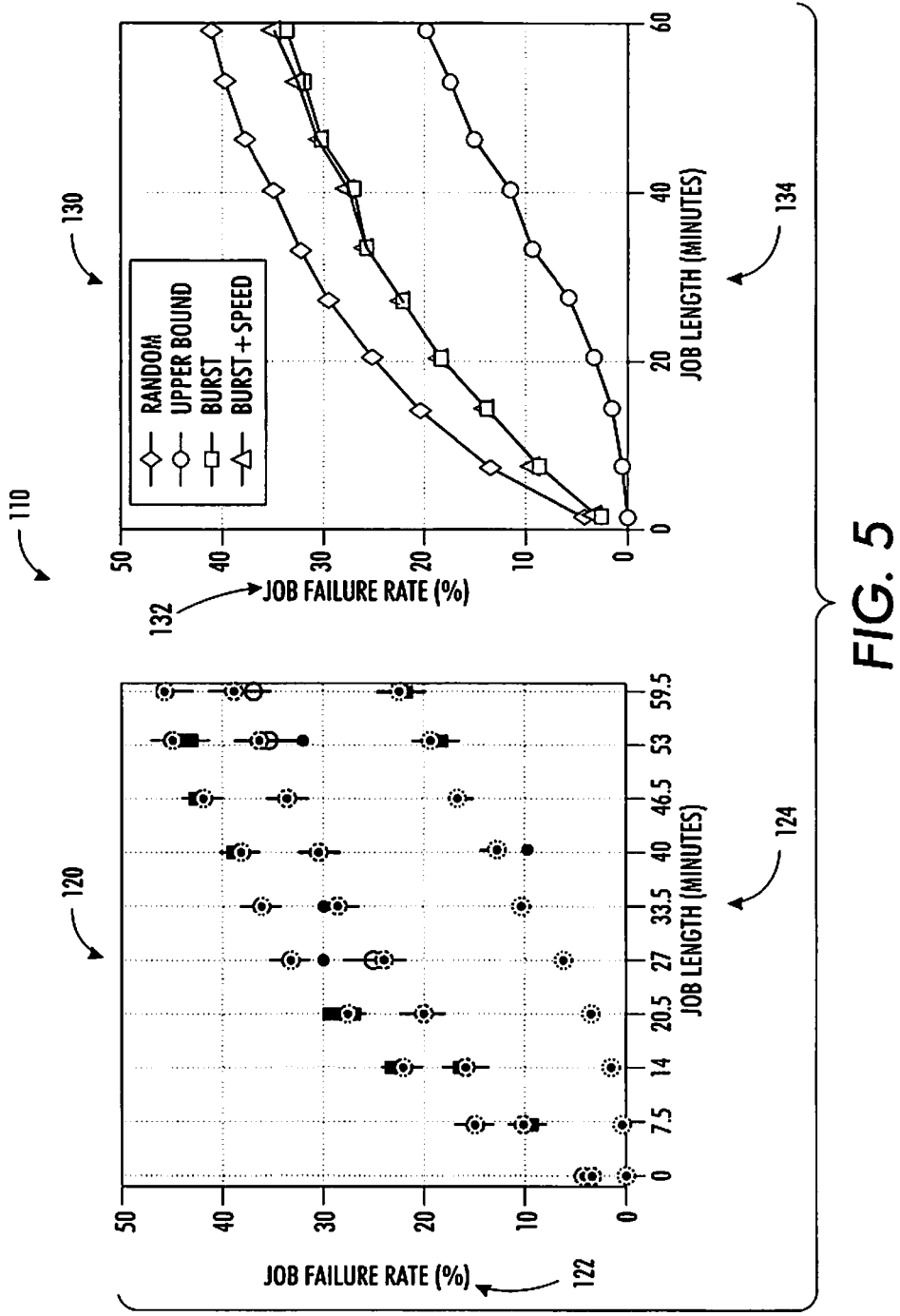
FIG. 5 shows two graphs illustrating statistical confidence of executing jobs of certain sizes, in accordance with the present disclosure.

Referring to FIG. 5, two graphs illustrating statistical confidence of executing jobs of certain sizes are illustrated, in accordance with the present disclosure.

The statistical confidence graphs 110 illustrate a first graph 120 having a y-axis 122 that pertains to a job failure rate percentage and an x-axis 124 that pertains to the job length in minutes. The statistical confidence graphs 110 illustrate a second graph 130 having a y-axis 132 that pertains to a job failure rate percentage and an x-axis 134 that pertains to the job length in minutes. The job length of first graph 120 is 1 minute and may satisfy a failure rate of 5%, whereas the job length of second graph 130 is 7 minutes and may satisfy a failure rate of 10%, both of which are within a 95% confidence level.

Thus, the viability of scheduling jobs on MFDs given the volatility they exhibit is displayed in FIG. 5. The proposed burstiness scheduling technique leverages the burstiness metric to make better job placement decisions. These placement decisions may reduce the number of preemptions experienced by jobs/tasks, and, thereby, may reduce the average job makespan, thus increasing the overall efficiency of the system. When a preemption is encountered, the executing job may halt execution on the current MFD and have to restart execution elsewhere (thereby increasing makespan). Additionally, when referring to statistical confidence intervals, it is noted that the reference is made to quantitative figures, such as quality of service (QoS) values being at or near SLA/set points.

Figure 6:
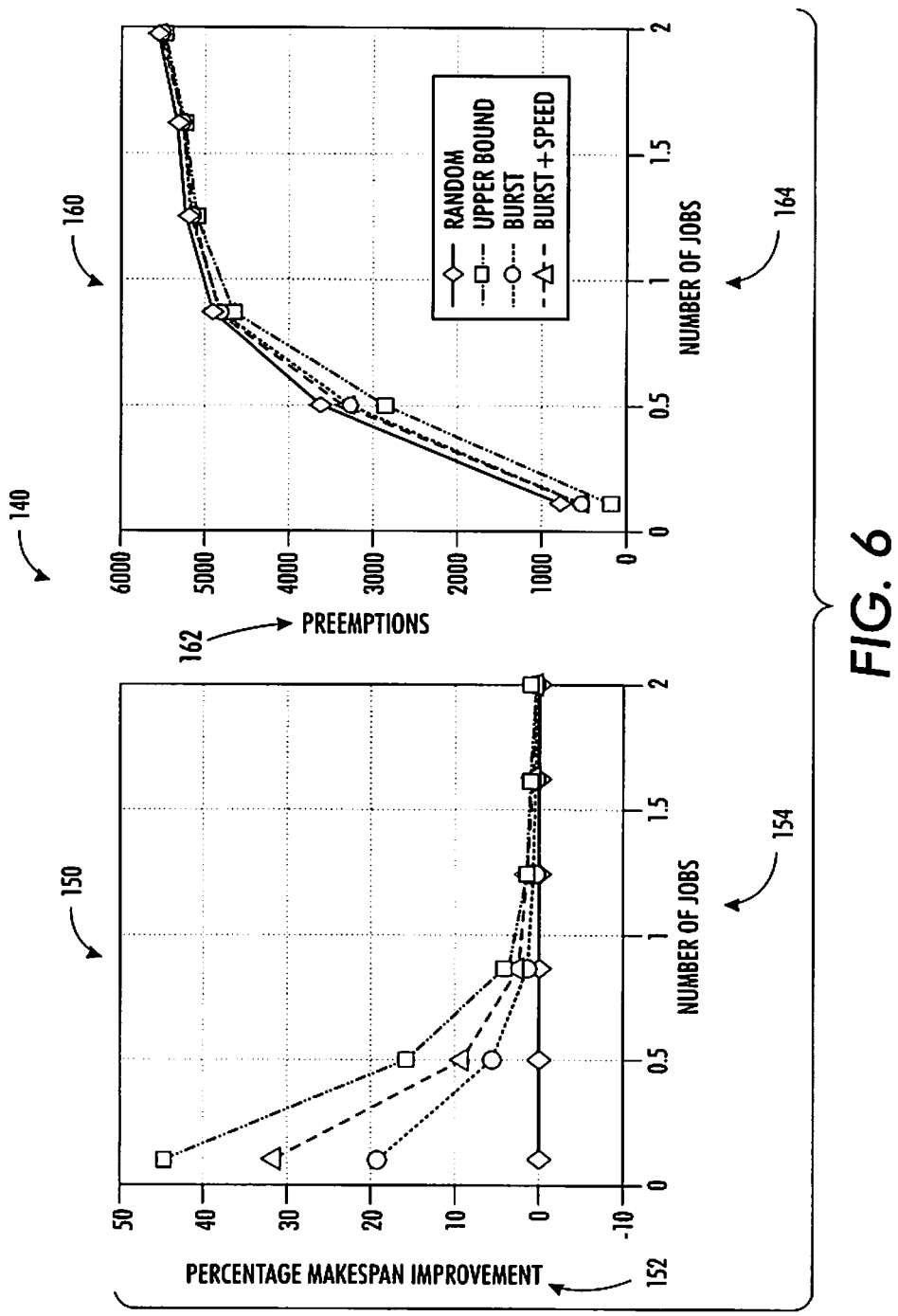
FIG. 6 shows two graphs illustrating performance of schedulers as cloud load increases, in accordance with the present disclosure.

Referring to FIG. 6, two graphs illustrating performance of schedulers as cloud load increases are illustrated, in accordance with the present disclosure.

The performance of schedulers graphs 140 illustrate a first graph 150 having a y-axis 152 that pertains to makespan improvement percentage and an x-axis 154 that pertains to the number of jobs. The performance of schedulers graphs 140 illustrate a second graph 160 having a y-axis 162 that pertains to preemptions and an x-axis 164 that pertains to the number of jobs.

Therefore, to summarize FIGS. 5 and 6, burstiness-aware schedulers that consider job and resource characteristics may help parallel computing on volatile distributed resources and may enhance SLAs such as availability, makespan, and preemption rate. The burstiness metric proposed characterizes the volatility of the high-priority native tasks. The computation of the burstiness metric may be more efficient and may be adopted in any type of embedded environments. A burstiness-aware scheduling heuristic opportunistically may introduce cloud jobs (the low-priority workload class) to avoid the higher-priority native applications, and effectively harvests idle cycles.

Figure 7:
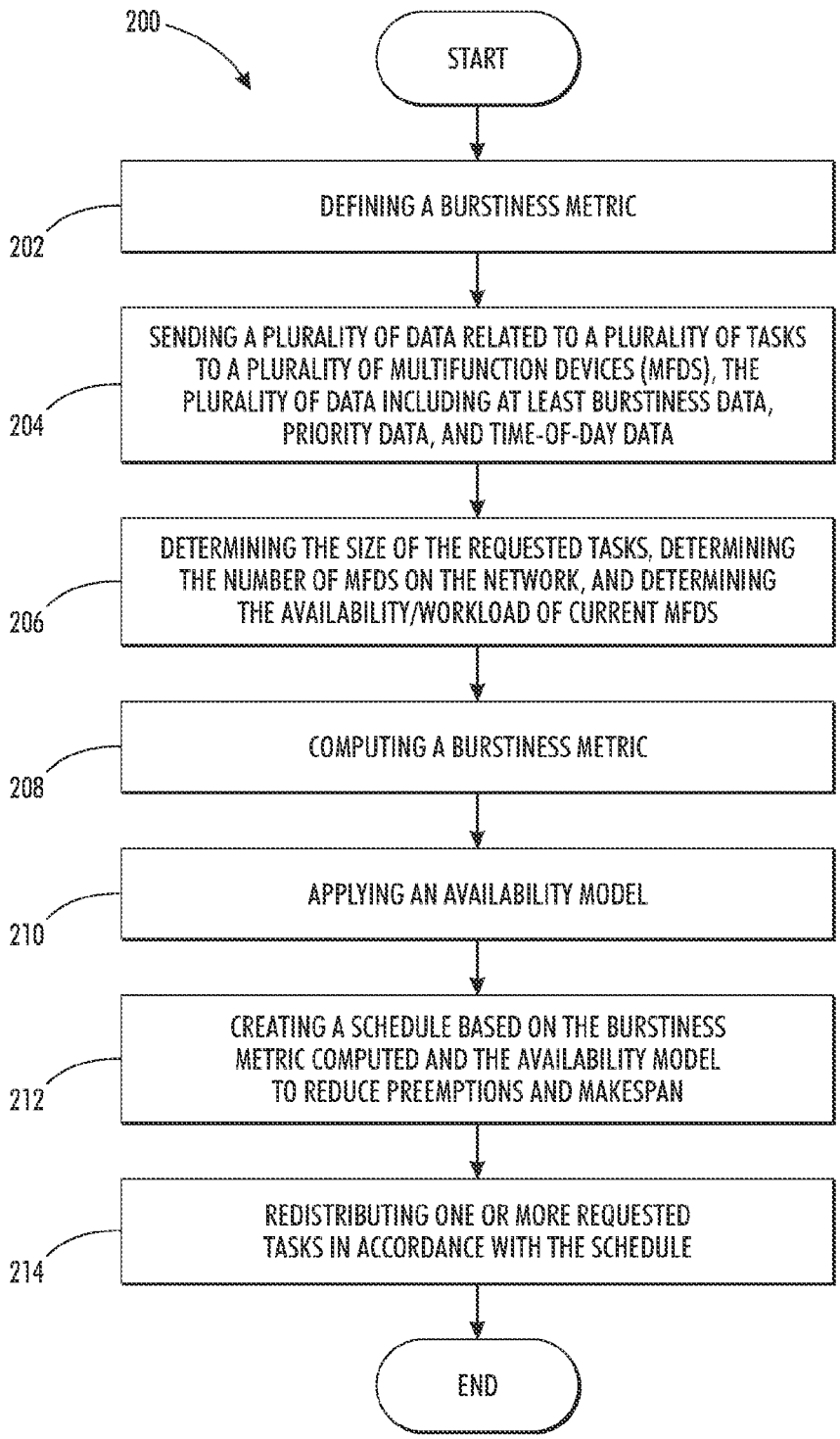
FIG. 7 shows a flowchart illustrating a method for analyzing timing characteristics of computing jobs/tasks on a plurality of MFDs within a network, in accordance with the present disclosure.

Referring to FIG. 7, a flowchart illustrating a method for analyzing timing characteristics of computing tasks on a plurality of MFDs is shown, in accordance with the present disclosure.

The flowchart 200 includes several steps for analyzing timing characteristics of computing tasks on a plurality of MFDs. In step 202, a burstiness metric may be defined. In step 204, a plurality of data related to a plurality of tasks may be sent to a plurality of multifunction devices (MFDs), the plurality of data including at least burstiness data, priority data, and time-of-day data. In step 206, the size of the requested tasks, the number of MFDs on the network, and the availability/workload of current MFDs may be determined. In step 208, the burstiness metric may be computed. In step 210, the availability model may be applied. In step 212, a schedule based on the burstiness metric computed and the availability model to reduce preemptions and makespan may be created. In step 214, one or more requested tasks in accordance with the schedule may be redistributed. The process then ends.

Thus, the proposed method may determine quantitatively the size of jobs (or excess capacity) for a given workload, fleet size, and fleet characteristics and therefore act as a provisioning aid. This may further be used to make cost-optimizing assessments on whether the operating fleet may be enough, under-provisioned or over-provisioned for a progressive increase/decrease in functionality/workload.

The algorithms (e.g., burstiness algorithm) detailed in the present disclosure may provide the distinction between core jobs and grid jobs and allow the grid jobs to have guaranteed completion. In theory, they may be applied and further customized to any number of queues that MFDs or electronic devices may have. Class 1 scheduling considers inelastic/inflexible jobs that cannot be preempted. Class 2 scheduling introduces elastic/flexible, distributed and replicated scheduling with the possibility of job preemption. As a result of the two scheduling classes, both kinds of jobs (e.g., core and grid) may be complete by providing quantitative guarantees on (a) resource exclusivity for class 1 and (b) completion probability for class 2, all based on burstiness algorithms.

Embodiments as disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection may be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the present disclosure may be practiced in network computing environments with many types of computer system configurations, including personal computers, hand-held devices, multi-processor systems, microprocessor-based or programmable consumer electronics, network PCs, minicomputers, mainframe computers, etc. The present disclosure may also be practiced in distributed computing environments where tasks may be performed by local and remote processing devices that may be linked (either by hardwired links, wireless links, or by a combination of hardwired or wireless links) through a communications network. In a distributed computing environment, program modules may be located in both local and remote memory storage devices.

The present disclosure proposes an alternative method that takes advantage of "job preemption" systems relating to printing jobs/tasks/activities/capabilities on MFDs (or electronic devices) in order to make the process of printing simple and as streamlined as possible to provide for an efficient user experience. The concepts of using a "job preemption" system and "burstiness" are general concepts in that they may be used for applications other than printers by any service provider. For example, service providers could use any type of printer and/or MFD and/or electronic device to achieve the desired results of the present disclosure. Also the printing system of the present disclosure may make it easier for information technology (IT) groups and/or service providers to manage/control/operate the printing environment for their clients.

A service provider may be any entity that develops, offers, controls, manages, owns, alters and/or sells software and/or hardware products. A service provider may be any entity that performs one or more tasks on one or more pre-existing MFDs or on one or more pre-existing electronic devices, which may or may not be controlled or owned by the service provider. For example, the entity may offer a service with an existing software package and/or with any type of existing Internet-based service through the Internet. In other words, a service provider need not own or provide the MFDs (or electronic devices). The MFDs (or electronic devices) may be owned or provided by any third party not related or associated with the service provider. In the present disclosure, it may be contemplated that the entity (such as a service provider) may offer any type of service and/or product to optimize pre-existing, pre-owned MFDs (or electronic devices) by referring potential customers to an Internet website or a store that may or may not be associated with printing-related services and/or products. The term "entity" may refer to anything that may exist as a discrete and/or distinct unit that owns, operates, manages, and/or controls one or more of a plurality of machines (such as MFDs or electronic devices). For example, the term "entity" may include the term "company."

Further, although aspects of the present disclosure have been described herein in the context of several particular implementations in particular environments for particular purposes, those of ordinary skill in the art will recognize that its usefulness may not be limited thereto and that the present disclosure may be beneficially implemented in any number of environments for any number of purposes.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which may also be intended to be encompassed by the following claims.

The invention claimed is:

1. A system for establishing a burstiness metric, the system comprising:
   at least one processor; and
   a non-transitory computer-readable storage medium in communication with the at least one processor, wherein the non-transitory computer-readable storage medium comprises one or more programming instructions for:
      receiving information related to a plurality of tasks performed by a plurality of electronic devices based on input received from one or more users;
      analyzing the received information;
      employing an availability model to the information analyzed;
      generating a schedule based on the information analyzed and the availability model by redistributing at least one task of the plurality of tasks between the plurality of electronic devices in accordance with electronic device availability and computational loads wherein the redistributing is based on at least four strategies: a random strategy, an upper bound strategy, a burst strategy, and a burst-speed strategy; and
      making an assessment based on the information analyzed to determine a proportion of the plurality of tasks to be supported to achieve a required quality of service.

2. The system according to claim 1, wherein the plurality of electronic devices are a plurality of multi-function devices.

3. The system according to claim 1, wherein the information includes at least a burstiness rate data, priority data, and time-of-day data.

4. The system according to claim 3, wherein the burstiness rate data is quantified by at least two parameters, a strength of burst parameter and a spread ratio parameter.

5. The system according to claim 1, wherein the redistributing of the at least one task depends on the size of the plurality of tasks, an amount of electronic devices within a network, and the electronic device availability and computational loads.

6. The system according to claim 1, wherein the redistributing is based on time-of-day activity schemes to ensure that the quality of service associated with the plurality of tasks is adhered to within a predetermined statistical confidence interval.

7. The system according to claim 1, wherein electronic device availability is based on the availability model having at least four states, an available state, a partially available state, a busy state, and a down state.

8. The system according to claim 1, wherein the plurality of tasks are separated into two categories, a first category of capabilities having a first loss tolerance and a second category of capabilities having a second loss tolerance, where the first category of capabilities has a higher processing priority than the second category of priorities.

9. The system according to claim 8, wherein the first category of capabilities includes core electronic device capabilities and wherein the second category of capabilities includes grid electronic device capabilities.

10. The system according to claim 9, wherein the core electronic device capabilities include user enabled activities and wherein the grid electronic device capabilities activities are created internally by the plurality of electronic devices.

11. The system according to claim 1, wherein the schedule generated based on the information analyzed and the availability model reduces makespan and preemption rates within a predetermined statistical confidence interval.

12. A method for establishing a burstiness metric, the method comprising:
performing one or more programming instructions via a tangible processor for:
receiving information related to a plurality of tasks performed by a plurality of electronic devices based on input received from one or more users;
analyzing the received information;
employing an availability model to the information analyzed;
generating a schedule based on the information analyzed and the availability model by redistributing at least one task of the plurality of tasks between the plurality of electronic devices in accordance with electronic device availability and computational loads wherein the redistributing is based on at least four strategies, a random strategy, an upper bound strategy, a burst strategy, and a burst-speed strategy; and
making an assessment based on the information analyzed to determine a proportion of the plurality of tasks to be supported to achieve a required quality of service.

13. The method according to claim 12, wherein the plurality of electronic devices are a plurality of multifunction devices.

14. The method according to claim 12, wherein the information includes at least a burstiness rate data, priority data, and time-of-day data.

15. The method according to claim 14, wherein the burstiness rate data is quantified by at least two parameters, a strength of burst parameter and a spread ratio parameter.

16. The method according to claim 12, wherein the redistributing of the at least one task depends on the size of the plurality of tasks, an amount of electronic devices within a network, and the electronic device availability and computational loads.

17. The method according to claim 12, wherein the redistributing is based on time-of-day activity schemes to ensure that the quality of service associated with the plurality of tasks is adhered to within a predetermined statistical confidence interval.

18. The method according to claim 12, wherein electronic device availability is based on the availability model having at least four states, an available state, a partially available state, a busy state, and a down state.

19. The method according to claim 12, further comprising separating the plurality of tasks into two categories, a first category of capabilities having a first loss tolerance and a second category of capabilities having a second loss tolerance, where the first category of capabilities has a higher processing priority than the second category of priorities.

20. The method according to claim 19, wherein the first category of capabilities includes core electronic device capabilities and wherein the second category of capabilities includes grid electronic device capabilities.

21. The method according to claim 20, wherein the core electronic device capabilities include user enabled activities and wherein the grid electronic device capabilities activities are created internally by the plurality of electronic devices.

22. The method according to claim 12, further comprising reducing makespan and preemption rates within a predetermined statistical confidence interval.

23. A system for establishing a burstiness metric, the system comprising:
at least one processor; and
a non-transitory computer-readable storage medium in communication with the at least one processor, wherein the non-transitory computer-readable storage medium comprises one or more programming instructions for:
receiving information related to a plurality of tasks performed by a plurality of electronic devices based on input received from one or more users;
analyzing the received information;
employing an availability model to the information analyzed;
generating a schedule based on the information analyzed and the availability model by redistributing at least one task of the plurality of tasks between the plurality of electronic devices in accordance with electronic device availability and computational loads; and
making an assessment based on the information analyzed to determine a proportion of the plurality of tasks to be supported to achieve a required quality of service wherein the plurality of tasks are separated into two categories, a first category of capabilities having a first loss tolerance and a second category of capabilities having a second loss tolerance, where the first category of capabilities has a higher processing priority than the second category of priorities, the first category of capabilities includes core electronic device capabilities and wherein the second category of capabilities includes grid electronic device capabilities.

24. The system according to claim 23, wherein the core electronic device capabilities include user enabled activities and wherein the grid electronic device capabilities activities are created internally by the plurality of electronic devices.

* * * * *